United States Patent

Touge et al.

[11] Patent Number: 5,945,600
[45] Date of Patent: Aug. 31, 1999

[54] ANGULAR RATE SENSOR

[75] Inventors: Hiroshi Touge, Ichinomiya; Yoshihiro Naruse, Kariya; Mitsuhiro Ando, Toyohashi, all of Japan

[73] Assignee: Aisin Seiki Kabushiki Kaisha, Kariya, Japan

[21] Appl. No.: 08/902,963

[22] Filed: Jul. 30, 1997

[30] Foreign Application Priority Data

Jul. 31, 1996 [JP] Japan ..................................... 8-201390

[51] Int. Cl.⁶ .................................................. G01P 9/04
[52] U.S. Cl. ..................................... 73/504.14; 73/504.12
[58] Field of Search ........................... 73/504.16, 504.12, 73/504.04, 504.02, 510, 514.32, 504.14, 514.16

[56] References Cited

U.S. PATENT DOCUMENTS

| 5,349,855 | 9/1994 | Bernstein et al. | 73/505 |
| 5,635,638 | 6/1997 | Geen | 73/504.12 |
| 5,721,377 | 2/1998 | Kurle et al. | 73/504.12 |
| 5,728,936 | 3/1998 | Lutz | 73/504.12 |

FOREIGN PATENT DOCUMENTS 743166  10/1995  Japan .

*Primary Examiner*—Hezron Williams
*Assistant Examiner*—Helen C. Kwok
*Attorney, Agent, or Firm*—Sughrue, Mion, Zinn, Macpeak & Seas, PLLC

[57] ABSTRACT

An angular rate sensor comprises an oscillator excited for oscillation in x-direction, a movable electrode disposed in opposing relationship with a stationary electrode along z-direction, and a movable electrode support for transmitting the oscillation of the oscillator in the z-direction to the movable electrode while interrupting the transmission of the oscillation in the x-direction, and is formed by a micromachining operation. The movable electrode support includes an oscillator support beam continuing from the oscillator and extending in y-direction, an electrode support beam continuing from the oscillator support beam and extending in the x-direction, and a connector stem extending in the x-direction form the electrode support beam and connected to the movable electrode at a position which represents the center of gravity of the movable electrode. When a turning force about the y-axis is applied to the oscillator, Coriolis force is produced and causes the oscillator to undergo an elliptical motion, depicting an ellipse on an x-z plane. The electrode support beam and the oscillator support beam interrupt the x-component of the elliptical oscillation while transmitting only the z-component to the movable electrode. An electrical circuit connected to the movable electrode produces an electrical signal representing the z-component of the oscillation.

14 Claims, 10 Drawing Sheets

ANGULAR RATE SENSOR

FIELD OF THE INVENTION

The invention relates to an angular rate sensor having electrodes which drive an oscillator for oscillation in x-direction and which detect components of oscillation of the oscillator occurring in response to an angular rate of rotation about y-axis which is orthogonal to the direction of oscillation x, appearing in z-direction which is orthogonal to the x-direction and also to the y-axis.

BACKGROUND OF THE INVENTION

An example of the angular rate sensor of the kind described is disclosed in U.S. Pat. No. 5,349,855 entitled "COMB DRIVE MICROMECHANICAL TUNING FORK GYRO". Another example is disclosed in Japanese Laid-Open Patent Application No. 43,166/95 entitled "ANGULAR RATE SENSOR". Each of these examples is a microgyro obtained by a micromachining of silicon using a semiconductor processing process.

An angular rate sensor of the kind described includes an oscillator in the form of a flat plate disposed in an x-y plane and having two sets of comb tines, each set disposed on one of lateral ends or a side extending parallel to the y-axis, with pairs of support limbs extending in the y-direction from the respective longitudinal ends or sides extending parallel to the x-axis, the limbs supporting the plate oscillator in a suspended manner to permit its oscillation in x- and z-direction. A first and a second set of stationary comb tines are disposed on the outside of the both lateral ends of the oscillator in an interdigitated manner with the first and the second set of comb tines on the oscillator while avoiding a contact therebetween and maintaining a microgap therebetween. An a.c. voltage of a frequency f is applied across the oscillator and the first and the second set of stationary comb tines so that the oscillator is alternately attracted by the electrostatic attraction from the first and the second set of stational comb tines for oscillation in the x-direction at the frequency f.

When an angular rate of rotation about the y-axis is applied to the oscillator while the latter is oscillating in the x-direction, Coriolis force is applied to the oscillator, which then undergoes an elliptical motion comprising the oscillation in the x-direction on which an oscillation in z-direction is superimposed. Thus an oscillation in the z-direction appears in the oscillator. An electrode is disposed in opposing relationship with the oscillator with a microgap therebetween and has a capacitance which varies in accordance with the oscillation in the z-direction. The variation has an amplitude which is approximately inversely proportional to the amplitude of the oscillation of the oscillator in the z-direction. By converting the capacitance thus determined into a corresponding electrical signal level or analog voltage, which represents a capacitance detection signal, there is obtained a voltage having an amplitude which is inversely proportional to the amplitude of the oscillator in the z-direction. Since this amplitude corresponds to the value of the angular rate, a synchronized detection of the capacitance detection signal in synchronism with an exciting signal applied to the oscillator allows a d.c. voltage having a level which corresponds to the value of the angular rate to be obtained.

Representing the mass of the oscillator by m, the amplitude of the oscillation by a, the period by ω and the angular rate by Ω, a maximum value of the rate of oscillation is given by a ω. Accordingly, the Coriolis force Fc has a maximum value Fcmax, which is defined as follows:

$$Fcmax = 2m\Omega a\omega$$

The Coriolis force Fc has a magnitude which is proportional to both a and ω. However, for a microgyro, a range over which ω is varied is limited by the structure of the microgyro. Accordingly, a Coriolis force Fc having an increased magnitude is developed by increasing the amplitude a. In order to generate the Coriolis force Fc most efficiently, an electrical drive circuit is designed to drive the oscillator for oscillation at its resonant frequency. Due to manufacturing errors, however, the resonant frequency varies from oscillator to oscillator, requiring a tuning of the drive circuit for each angular rate sensor. However, the smaller the size of the sensor, the greater the manufacturing errors or the variation, whereby a difficulty is involved in the tuning.

SUMMARY OF THE INVENTION

The invention has for its first object the provision of an angular rate sensor having a high accuracy of detection of an angular rate, and has for its second object facilitating a tuning of the resonant frequency of oscillator electrodes.

(1) In accordance with the invention, an angular rate sensor comprises a base (1), an oscillator (6, 17, 21) supported by the base (1) so as to be oscillatable in x- and z-directions, exciting means (4, 5, 18, 19) for exciting the oscillator for oscillation in the x-direction, a stationary electrode (8, 14) and a movable electrode (7, 13, 21h) disposed in opposing relationship in the z-direction, and support means (2, 3, 15, 16, 21i, 21j) for supporting the movable electrode and for transmitting the oscillation of the oscillator to the movable electrode. To facilitate understanding the invention, numerals and characters used to denote corresponding elements or members shown in embodiments which are shown in FIGS. 1 and 4 to 8 and to be described later are entered in parentheses.

In accordance with the invention, when an angular rate about the y-axis is applied while the oscillator (6, 17, 21) is oscillating in the x direction, the oscillator undergoes an elliptical motion, depicting an ellipse in x-z plane. Thus, a z-oscillation component appears in addition to the x-oscillation component. The amplitude of the z-oscillation component corresponds to an angular rate applied, and the greater the amplitude corresponding to the angular rate, the higher the sensitivity of the angular rate sensor. The support means (2, 3, 15, 16, 21i, 21j) transmit the oscillation of the oscillator to the movable electrode (7, 13, 21h), and thus the movable electrode also oscillates. The z-oscillation component of the resulting oscillation of the movable electrode causes the movable electrode to oscillate in a manner toward and away from the stationary electrode (8, 14). In other words, a relative distance of the movable electrode with respect to the stationary electrode, as viewed in the z-direction, oscillates. A capacitance between the stationary and the movable electrode is inversely proportional to the relative distance, and thus the capacitance also oscillates. By determining the capacitance between the stationary and the movable electrode, and an amplitude of such oscillation, it is possible to determine the angular rate.

Since the oscillator is excited for oscillation in the x-direction by the exciting means (4, 5, 18, 19), it is preferred that the resonant frequency of the oscillator for oscillation in the x-direction be in coincidence with the exciting frequency from the exciting means (4, 5, 18, 19). When such choice is made, a power efficiency of the exciting means (4, 5, 18, 19) will be highest during the excitation of the oscillator. It is also preferred that the resonant frequency of the movable electrode in its oscillation in the z-direction be in coincidence with the resonant frequency of the exciting means (4, 5, 18, 19). If such choice is made, the amplitude of the oscillation of the movable electrode in the z direction when the angular rate is applied increases, enhancing the sensitivity of detecting the angular rate.

When a single flat plate is used as both an oscillator and a movable electrode as occurs in the prior art, a design and tuning which bring the resonant frequency of the plate in both x- and z-directions to a common value which coincides with the resonant frequency will be very difficult or time consuming and cumbersome since two axes are involved. For example, a tuning of the resonant frequency takes place by applying a boring or milling operation to part of the plate through a laser machining process. However, when the plate is machined in order to tune the resonant frequency in the x-direction, this also changes the resonant frequency in the z-direction.

All that is required for the design or tuning of the angular rate sensor according to the invention is to choose a resonant frequency of the oscillator in the x-direction which is equal to a design value or exciting frequency and to choose a resonant frequency of the movable electrode in the z-direction which is equal to a design value or exciting frequency. Since these are a single axis machining, the design is facilitated and a subsequent tuning is also facilitated. For example, a laser machining process may be employed to tune the resonant frequency of the oscillator in the x-direction and another laser machining operation may be employed to tune the resonant frequency of the movable electrode in the z-direction. Since the oscillator and the movable electrode are substantially separate from each other, even though they are contiguous locally, the degree to which a machining operation to tune one of the resonant frequencies in the x-and z-directions influence upon the other resonant frequency is greatly reduced.

(2) In each embodiment to be described later in connection with FIGS. 1 and 4 to 8, the movable electrode support means (2, 3, 15, 16, 21*i*, 21*j*) substantially operate to transmit only the oscillation in the z-direction from the oscillator to the movable electrode while substantially isolating the oscillation in the x-direction. Accordingly, the movable electrode oscillates substantially only in the z-direction. Since there is no oscillation in the z-direction when no angular rate is applied to the oscillator, the movable electrode remains substantially free from oscillation. It is only when an angular rate is applied to the oscillator to cause it to oscillate in the z direction that the movable electrode oscillates in the z-direction. When the resonant frequency of the movable electrode coincides with the exciting frequency applied to the oscillator, the movable electrode oscillates in the z-direction with an increased amplitude.

If the movable electrode were caused to oscillate in the x-direction also, a microscopic deviation from parallelism between the movable and the stationary electrode or a microscopic tilting of the movable electrode would cause a wobble or an oscillation in the capacitance between the movable and the stationary electrode, which represents a noise with respect to the oscillation of the capacitance which is caused by the angular rate. However, when an oscillation in the x-direction of the movable electrode is substantially prevented, such a noise will be minimized. This means that the accuracy with which the angular rate is detected is high.

(3) In each of embodiments shown in FIGS. 1 and 4 to 6, the movable electrode support means (2, 3, 15, 16) includes a first set of stems (3*d*, 3*e* shown in FIG. 1) which are integral with the oscillator (6, 17) at their one end and extending in a direction orthogonal to the x-direction, and a second set of stems (3*c*) integral with the other end of the first mentioned stems and extending in the x-direction. The first set of stems (3*d*, 3*e*) are flexural in the x-direction, whereby the oscillation of the oscillator (6, 17) in the x-direction is hardly transmitted to the second set of stems. In addition, the second set of stems (3*c*) extend in the x-direction, and is therefore capable of oscillating in the z-direction, but substantially cannot oscillate in the x-direction. In this manner, a transmission of the oscillation of the oscillator in the x-direction to the movable electrode is isolated, while allowing a transmission of the oscillation in the z-direction.

(4) In each of embodiments shown in FIGS. 1 and 4 to 6, the movable electrode support means (2, 3, 15, 16) includes anchorages (3*a*, 3*b*) which are secured to the base (1) and which are integral with the ends, as viewed in the x-direction, of the second set of stems (3*c* shown in FIG. 1), supporting the movable electrode (7, 13) and also supporting the oscillator (16, 17) through the first set of stems (3*d*, 3*e*).

Figure 1:
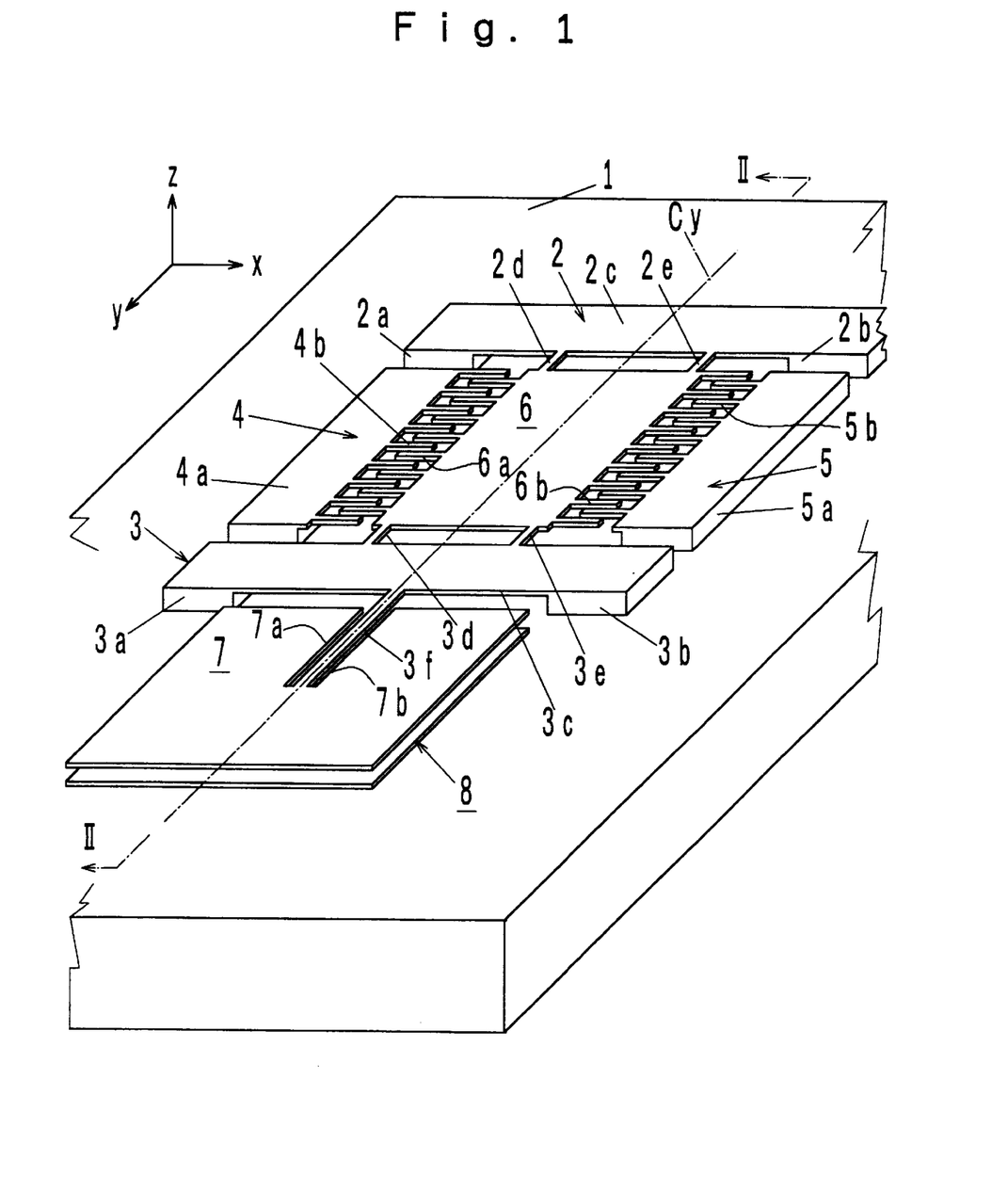
FIG. 1 is a perspective view of a first embodiment of the invention.

(5) An embodiment shown in FIG. 1 additionally includes oscillator support means (2) including a third set of stems (2*d*, 2*e*) extending in a direction orthogonal to the x-direction and having their one end integrally connected to the oscillator (6), a fourth set of stems (2*c*) integrally connected with the other end of the stems in the third set and extending in the x-direction, and anchorages (2*a*, 2*b*) secured to the base (1) and which are integrally connected to the fourth set of stems at their end in the x-direction.

Figure 4:
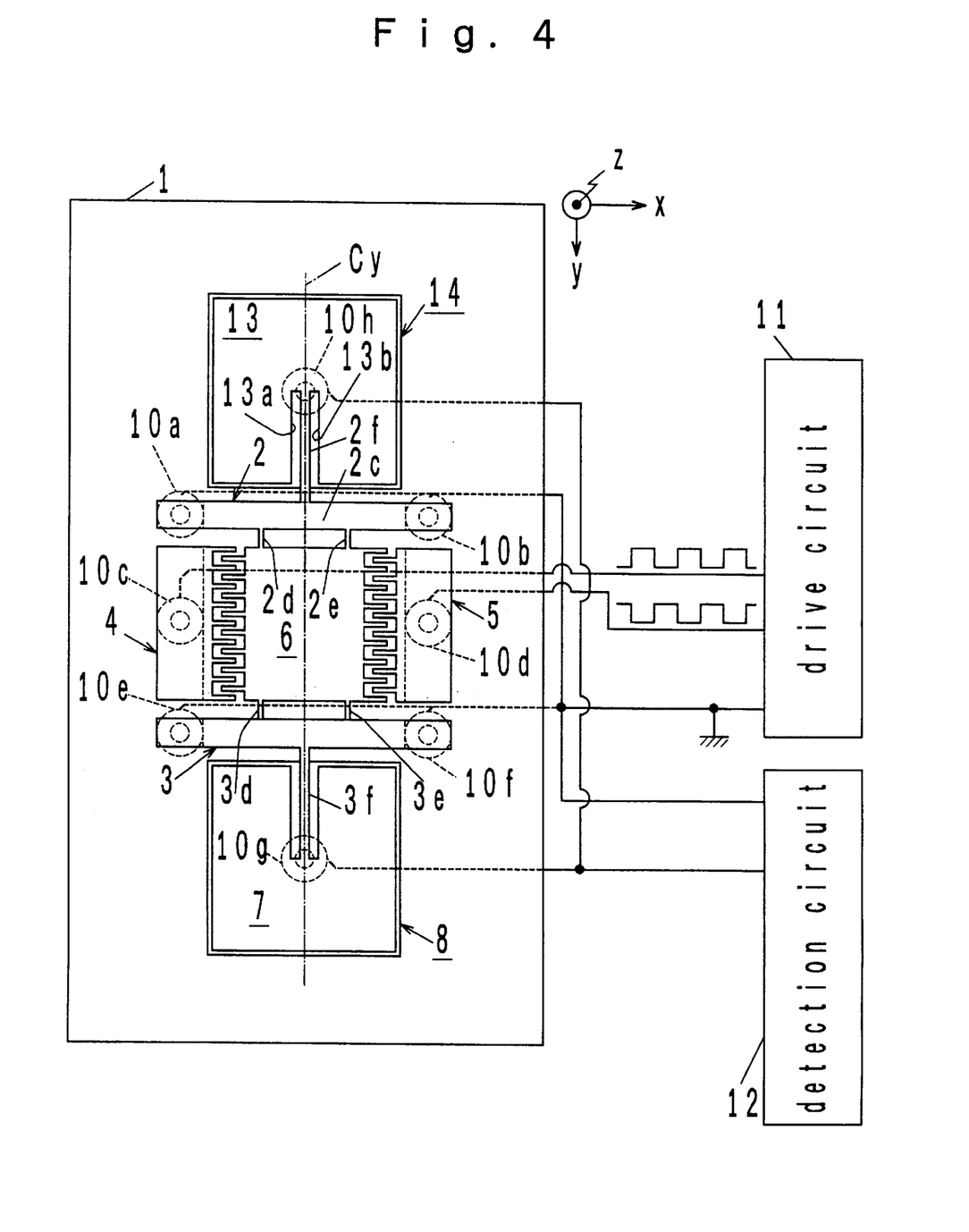
FIG. 4 is a plan view of a second embodiment of the invention.

(6) In an embodiment shown in FIG. 4, the movable and the stationary electrode include a first and a second movable electrodes (7, 13) and a first and a second stationary electrode (8, 14) which are disposed substantially symmetrically with respect to the oscillator 6. The movable electrode support means comprises a first support member (3) including a first set of stems extending in a direction orthogonal to the x-direction and integrally connected to the oscillator at their one end, a second set of stems integrally connected to the other end of the stems in the first set and extending in the x-direction, and anchorages secured to the base and integrally connected to the end, as viewed in the x-direction, of the stems in the second set for supporting the first movable electrode (7) and for supporting the oscillator (6) through the first set of stems, and a second support member (2) disposed in substantially symmetrical relationship to the first support member (3) with respect to the oscillator (6) and constructed substantially in the same manner as the first support member (3) for supporting the second movable electrode (13) and the oscillator (6).

Since each of the first support member (3) and the second support member (2) support the oscillator (6) in a cantilever fashion on the opposite sides thereof, the support for the oscillator (6) is stabilized. Since there are two pairs of movable and stationary electrodes, the pair of movable electrodes (7, 13) can be connected in parallel and the pair of stationary electrodes (8, 14) are also connected in parallel to derive a capacitance of an increased magnitude, thus increasing the amplitude of the oscillation of the capacitance which is caused by the oscillation of the movable electrodes in the z-direction, achieving a higher resolution in detecting the angular rate.

Figure 5:
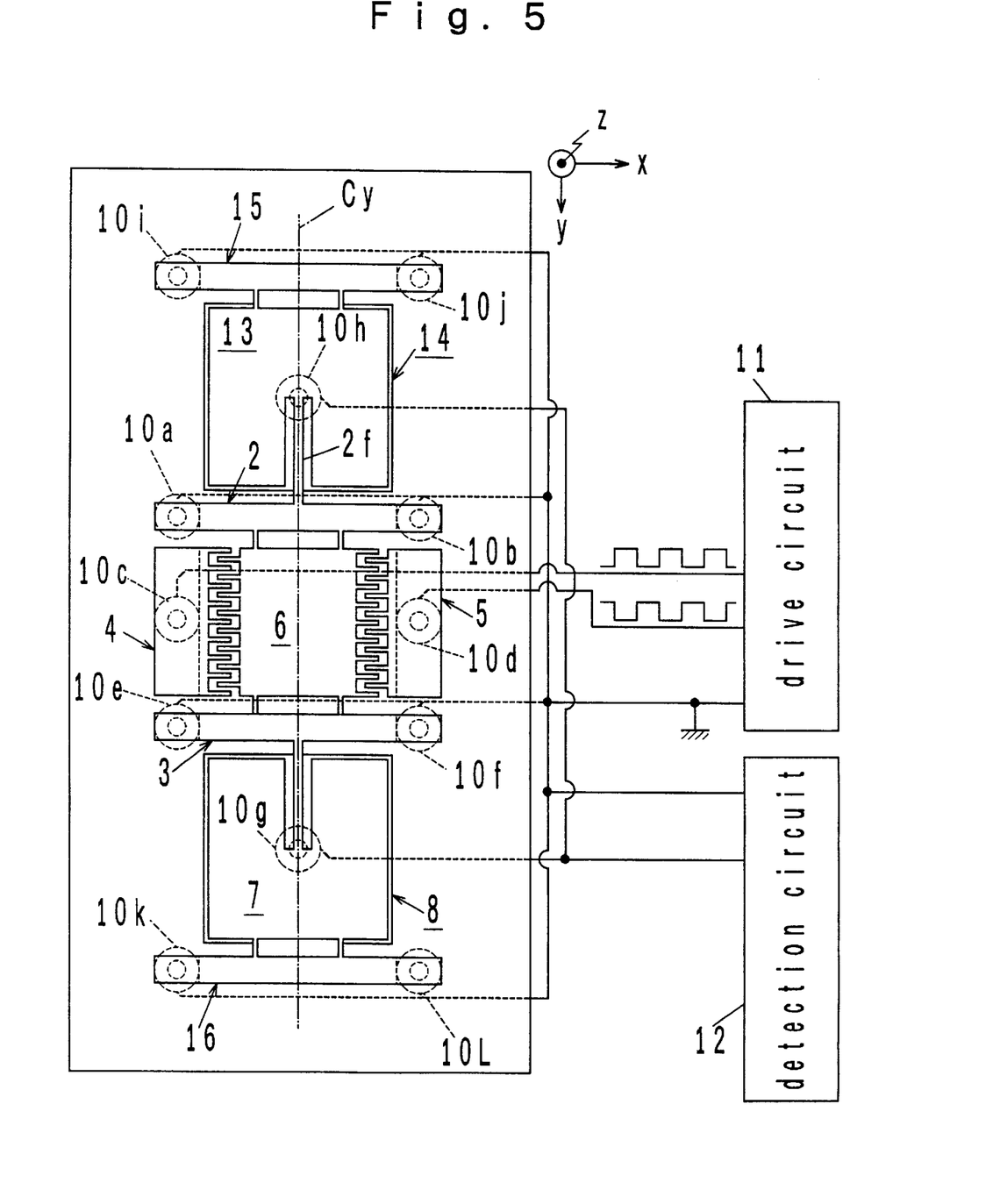
FIG. 5 is a plan view of a third embodiment of the invention.

(7) An embodiment shown in FIG. 5 comprises a third support member (16) including a third set of stems extending in a direction orthogonal to the x-direction and integrally connected to the first movable electrode (7) at their one end, a fourth set of stems extending in the x direction and integrally connected to the other end of the stems in the third set, and anchorages secured to the base and integrally connected to the end, as viewed in the x-direction, of the stems in the fourth set, and a fourth support member (15) disposed in substantially symmetrical relationship to the third support member (16) with respect to the oscillator (6) and constructed in substantially same manner as the third support member (16) for supporting the second movable electrode (13).

Since each of the first support member (3) and the third support member (16) supports the first movable member 7 in a cantilever fashion on the opposite sides thereof, the support for the first movable electrode (7) is stabilized. Similarly, the second support member (2) and the fourth support member (15) support the second movable electrode (13) in a similar cantilever fashion on the opposite sides thereof, thus stabilizing the support for the second movable electrode (13).

(8) In each of embodiments shown in FIGS. 1, 4 and 5, the movable electrode support means (3, 2) includes a connector stem (3f shown in FIG. 1) extending in the y-direction from the second set of stems to a position representing the center of gravity of the movable electrode (7, 13) or to the vicinity thereof where it is connected to the movable electrode. This reduces the flexure of the movable electrode as compared with an arrangement in which the movable electrode is supported at its end, and also achieves a high parallelism of the movable electrode with respect to the stationary electrode during the oscillation of the movable electrode in the z-direction, thus reducing distortions from a sinusoidal wave of the oscillation of the capacitance across the both electrodes and achieving a high accuracy with which the angular rate can be detected.

Figure 6:
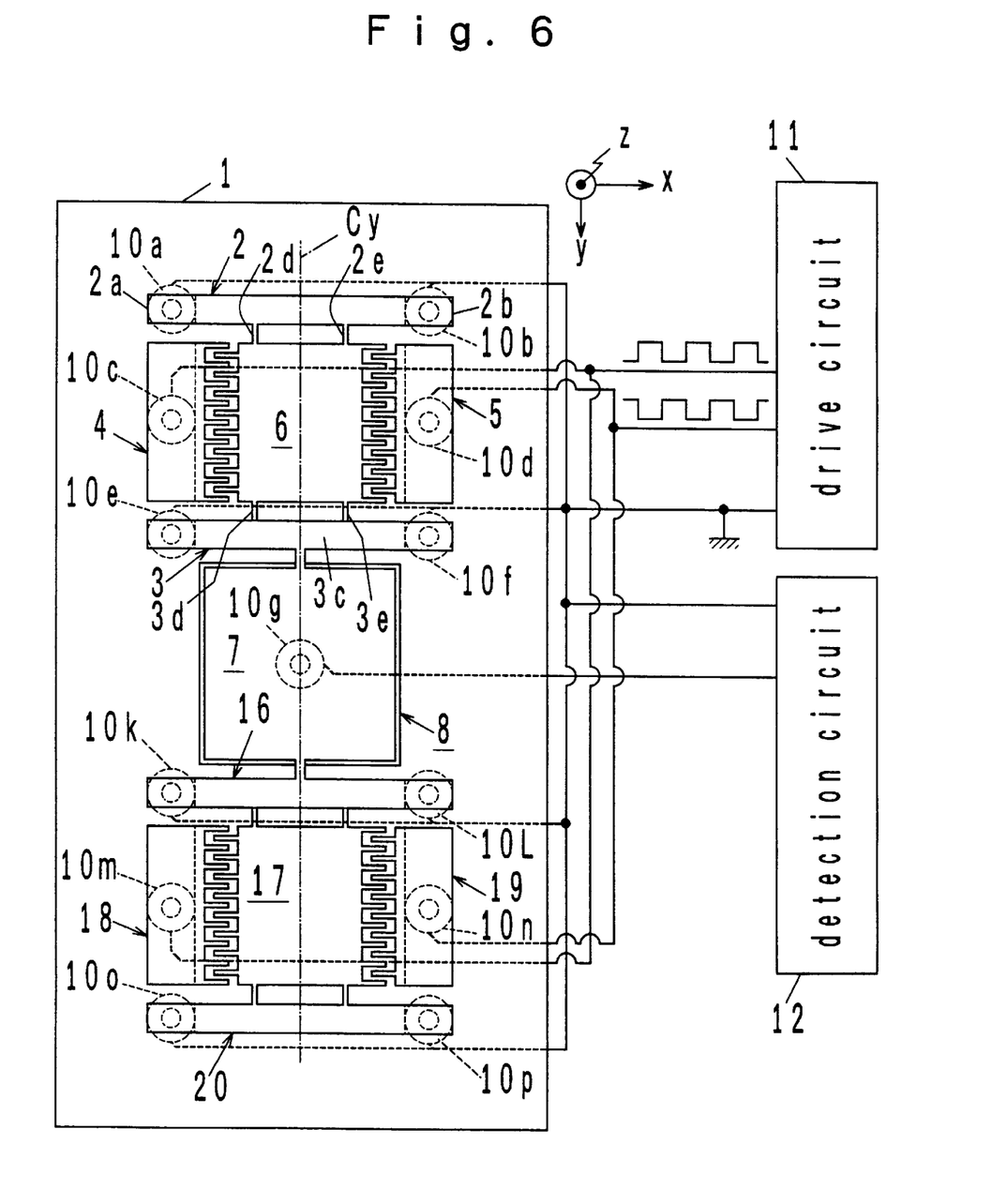
FIG. 6 is a plan view of a fourth embodiment of the invention.

(9) In an embodiment shown in FIG. 6, the oscillator comprises a first and a second oscillator (6, 17) which are disposed substantially symmetrically with respect to the movable electrode (7). The movable electrode support means comprises a first support member (3) including a first set of stems extending in a direction orthogonal to the x-direction and integrally connected to the first oscillator at their one end, a second set of stems extending in the x-direction and integrally connected to the other end of the stems in the first set, and anchorages secured to the base and integrally connected to the end, as viewed in the x-direction, of the stems in the second set for supporting the movable electrode (7) and for supporting the first oscillator (6) through the first set of stems, and a second support member (16) disposed in substantially symmetrical relationship to the first support member (3) with respect to the movable electrode (7) and constructed substantially in the same manner as the first support member (3) for supporting the movable electrode (7) and the second oscillator (17).

With this construction, each of the first support member (3) and the second support member (16) supports the movable electrode (7) in a cantilever fashion on the opposite sides thereof, thereby stabilizing the support for the movable electrode (7). In addition, since the oscillation occurring in the z direction when the angular rate is applied is applied to the respective ends of the movable electrode from the first and the second oscillator (6, 17) where it is supported in a cantilever fashion, a high level of parallelism is achieved between the movable electrode and the stationary electrode during the time the movable electrode is oscillating in the z-direction, thus reducing the distortions from a sinusoidal wave of the oscillation of the capacitance therebetween and thus achieving a high accuracy with which the angular rate can be detected.

(10) An embodiment shown in FIG. 6 comprises a third support member (2) including a third set of stems extending in a direction orthogonal to the x-direction and integrally connected to the first oscillator (6) at their one end, a fourth set of stems extending in the x-direction and integrally connected to the other end of the stems in the third set, and anchorages secured to the base and integrally connected to the end, as viewed in the x-direction, of the stems in the fourth set, and a fourth support member (20) disposed in substantially symmetrical relationship to the third support member (2) with respect to the movable electrode (7) and constructed substantially in the same manner as the third support member (2) for supporting the second oscillator (17). Each of the first support member (3) and the third support member (2) supports the first oscillator (6) in a cantilever fashion on the opposite sides thereof, and each of the second support member (16) and the fourth support member (20) supports the second oscillator (6) in a cantilever fashion on the opposite size thereof, thus stabilizing the support for the first and the second oscillator (6, 17).

Figure 7A:
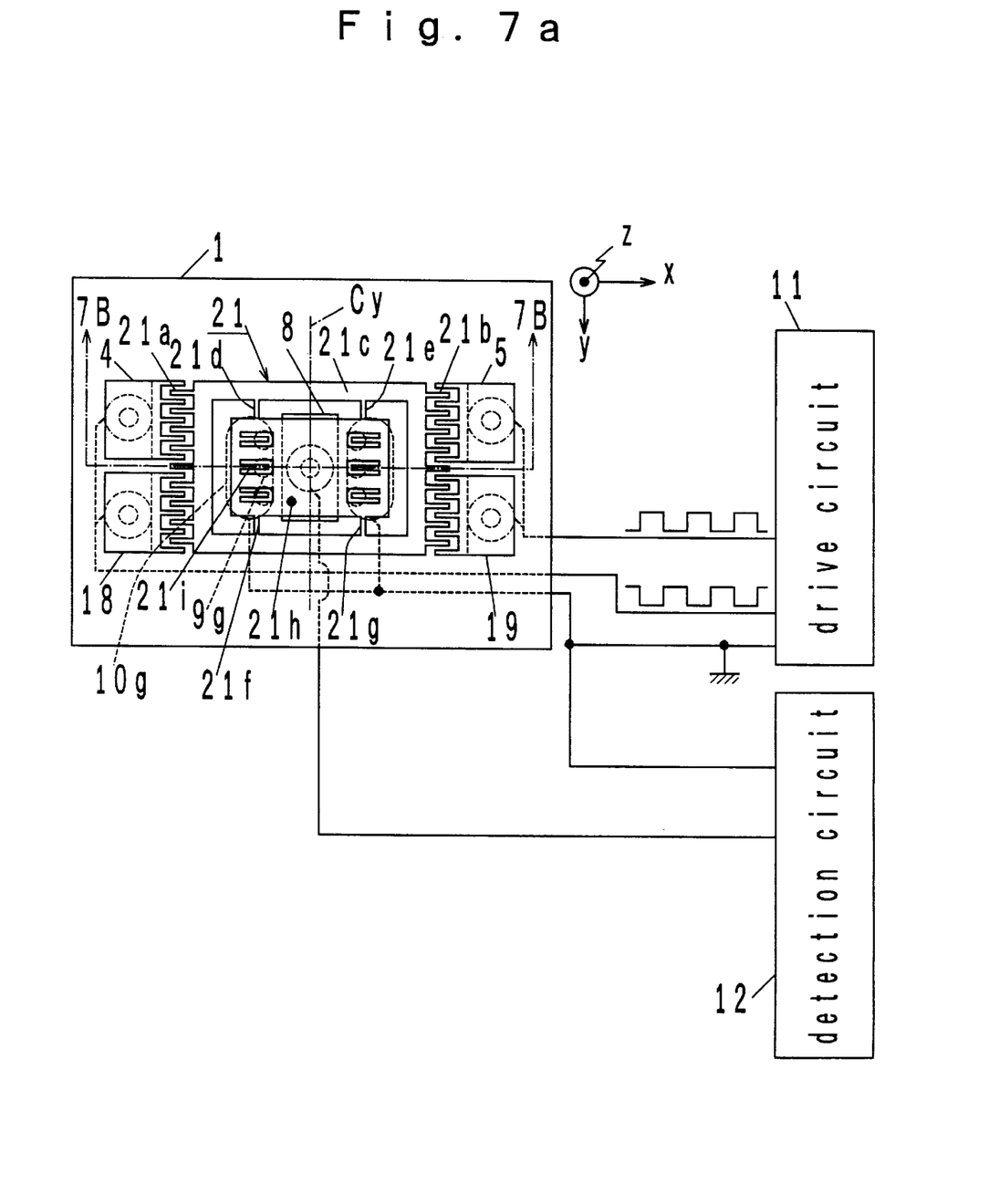
FIG. 7a is a plan view of a fifth embodiment of the invention.
Figure 7B:
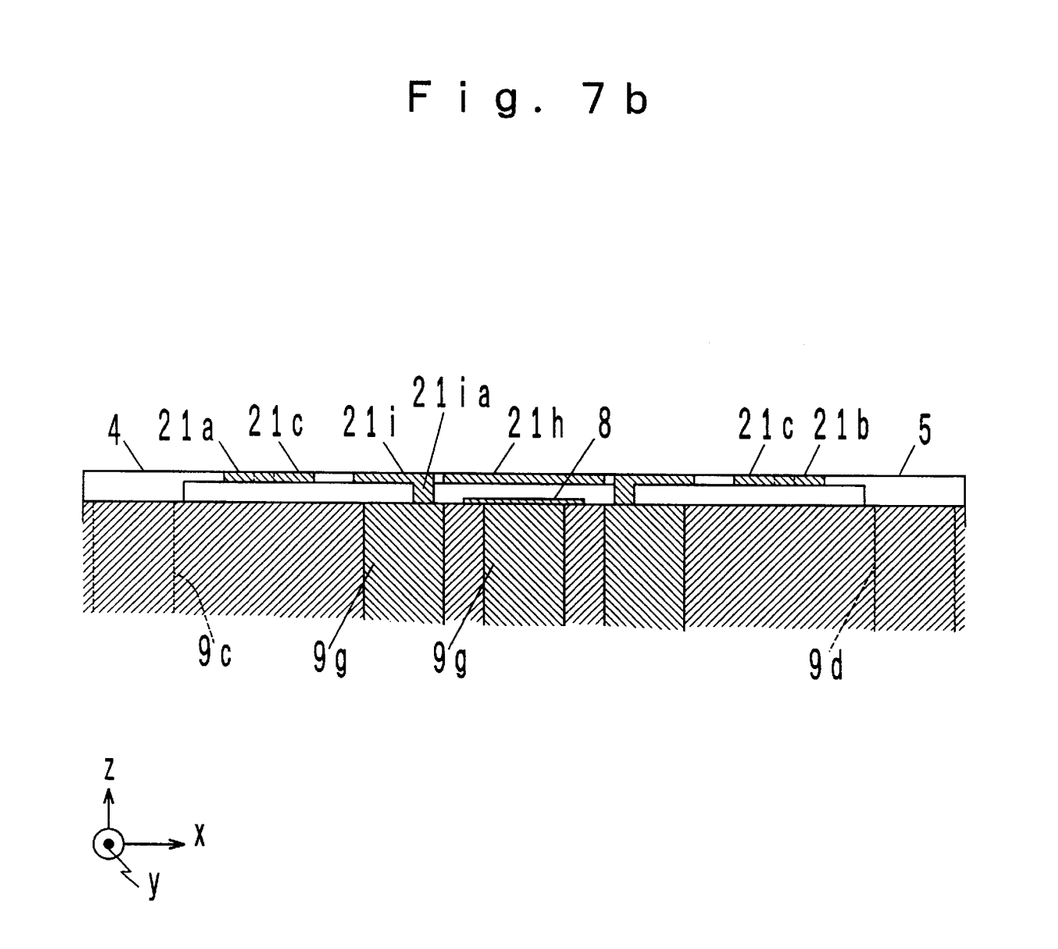
Figure 8A:
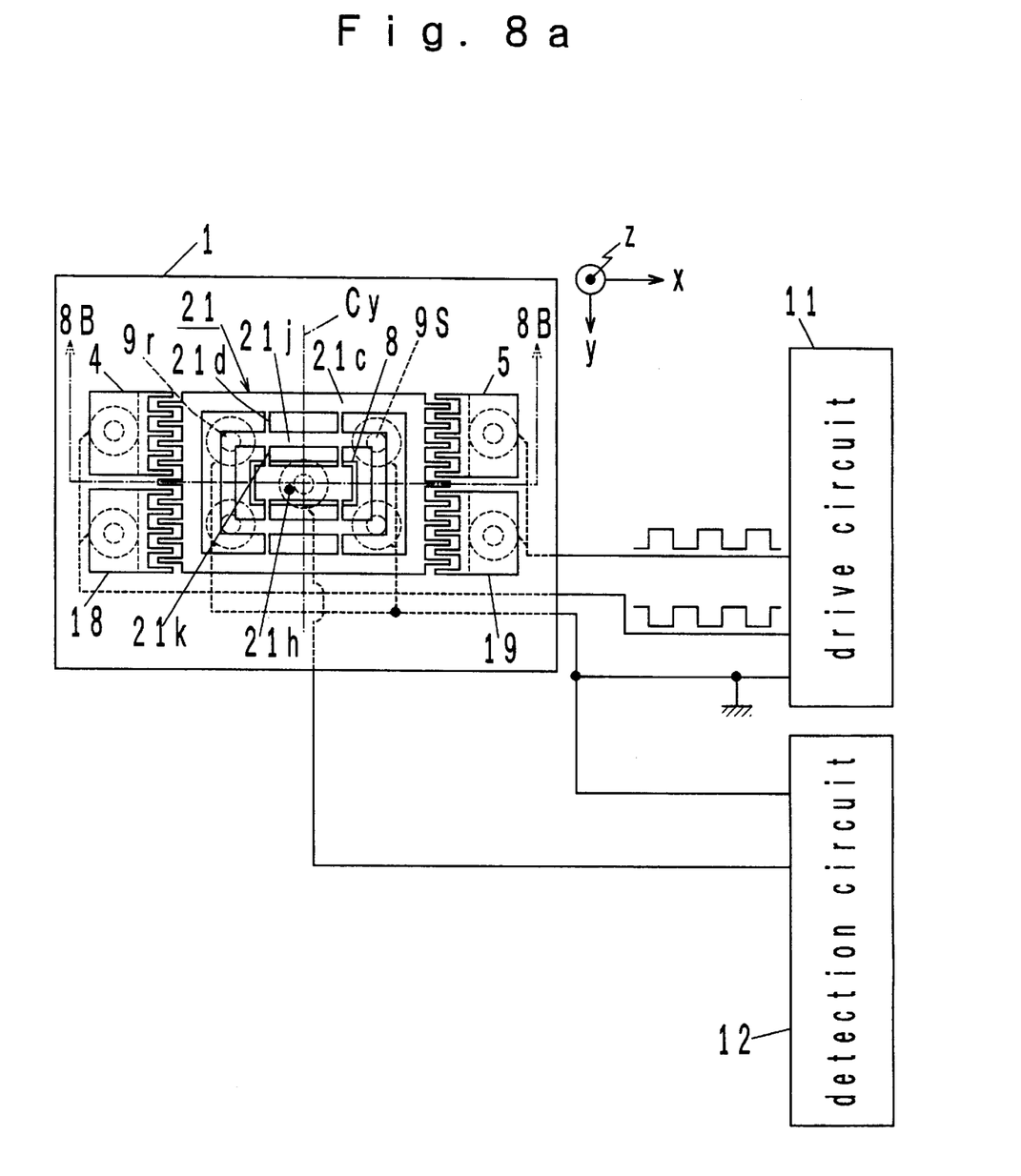
FIG. 8a is a plan view of a sixth embodiment of the invention.
Figure 8B:
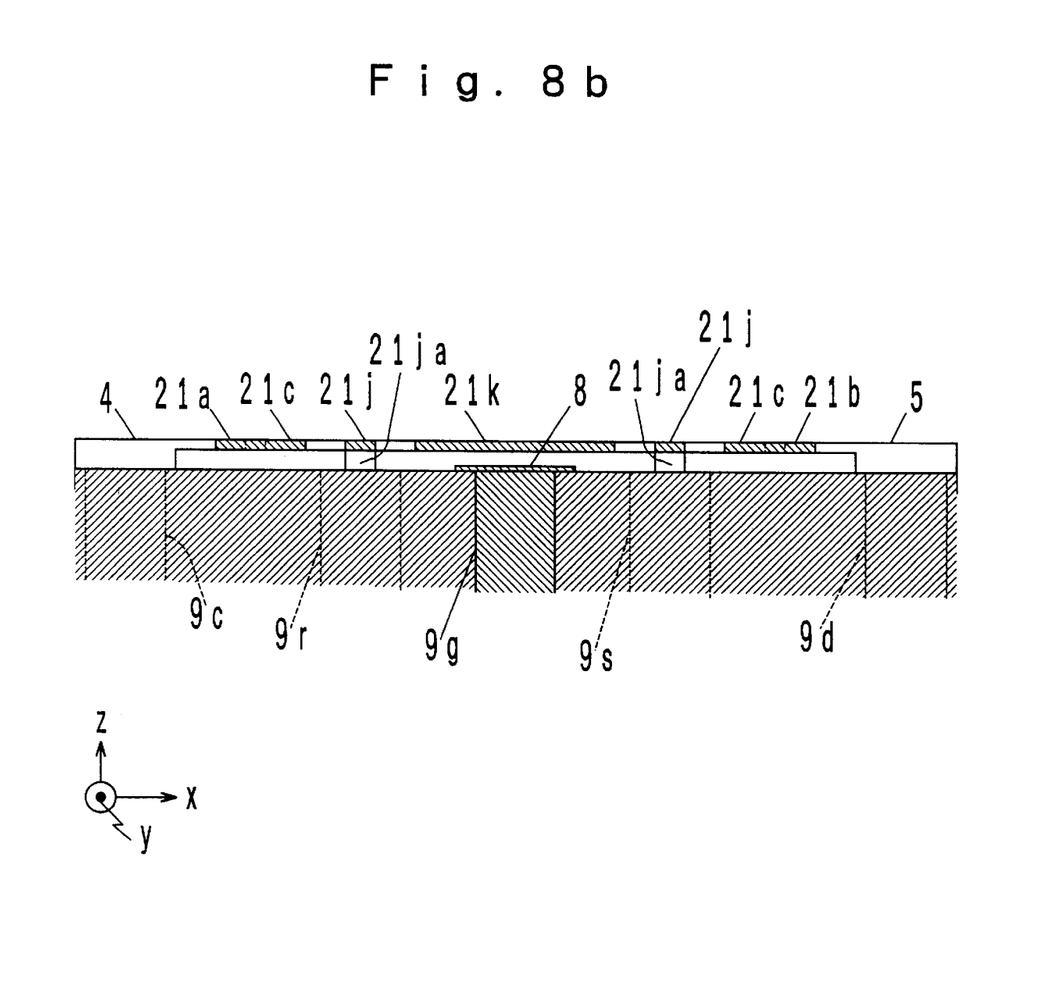

(11) In each of embodiments shown in FIGS. 7 and 8, the movable electrode (21h) is located within a frame of the oscillator (21), and the oscillator (21) and the movable electrode (21h) lie substantially in a common plane. The location of the movable electrode (21) within the frame of the oscillator (21) allows a reduction in the size of the sensor, facilitating an etching treatment which is required to separate the oscillator, the movable electrode and the base and thus reducing a manufacturing cost.

(12) In an embodiment shown in FIG. 7, the movable electrode support means includes a first set of stems (21d) extending in a direction orthogonal to the x-direction and continuing to the oscillator (21) at their one end and continuing to the movable electrode (21h) at the other end, and a second set of stems (21i) extending in the x direction and continuing to the movable electrode (21h). The first and the second set of stems operate to transmit only the oscillation in the z-direction to the movable electrode (21h) without transmitting the oscillation in the x-direction of the oscillator (21), thus achieving a high level of parallelism of the movable electrode with respect to the stationary electrode and achieving a high accuracy with which the angular rate can be detected.

(13) In an embodiment shown in FIG. 8, the movable electrode support means includes a first set of stems extending in a direction orthogonal to the x-direction and integrally connected to the oscillator (21) at their one end, a second set of stems (21j) extending in the x direction and integrally connected to the other end of the stems in the first set, and a third set of stems (21k) integrally connected to the stems (21j) in the second set at their one end and integrally connected to the movable electrode (21h) at their other end. The first, the second and the third set of stems transmit only the oscillation in the z-direction to the movable electrode (21h) without transmitting the oscillation in the x-direction of the oscillator (21), thus achieving a high level of parallelism of the movable electrode with respect to the stationary electrode and achieving a high accuracy with which the angular rate can be detected.

(14) In each of embodiments shown in FIGS. 7 and 8, the movable electrode support means includes anchorages (21ia, 21ja) secured to the base and integrally connected to the end, as viewed in the x-direction, of the second set of stems (21i, 21j) for supporting the movable electrode (21h) and also supporting the oscillator (21) through the movable electrode (21h) and the first set of stems (21d). In this manner, the support for the movable electrode is stabilized.

Other objects and features of the invention will become apparent from the following description of several embodiments with reference to the drawings.

BRIEF DESCRIPTION OF THE DRAWINGS

FIG. 7b is a cross section, to an enlarged scale, taken along the line 7B—7B shown in FIG. 7a;

FIG. 8b is a cross section, to an enlarged scale, taken along the line 8B—8B shown in FIG. 8a.

DESCRIPTION OF THE PREFERRED EMBODIMENTS

First Embodiment

Referring to FIG. 1 which shows a microgyro or angular rate sensor according to a first embodiment of the invention, a silicon substrate 1 provided as an insulator is formed with plate oscillator anchorages 2a, 2b, drive electrode anchorages 4a, 5a and movable electrode anchorages 3a, 3b, which are formed by polysilicon containing an impurity to make them electrically conductive.

An oscillator support beam 2c extending in an x-direction continues between the oscillator anchorages 2a and 2b, and a pair of stems 2d, 2e extends in a y-direction from the support beam 2c and continues to a plate oscillator 6 which is substantially parallel to the surface of the substrate 1. A pair of stems 3d, 3e extending in the y direction from a movable electrode support beam 3c continues to the plate oscillator 6, the support beam 3c extending in the x-direction between the movable electrode anchorages 3a, 3b.

A connector stem 3f extends in the y-direction from the movable electrode support beam 3c and its distal end continues to a movable electrode 7 at a position which represents the center of gravity of the movable electrode 7. In order to prevent the movable electrode 7 to be cantilevered by the connector stem 3f at the lateral edge of the movable electrode 7, the movable electrode 7 is formed with a pair of slits 7a, 7b, thus permitting the connector stem 3f to extend to the position of the center of gravity of the movable electrode 7. A stationary electrode 8 which is used for detecting a capacitance is disposed on the surface of the substrate 1 at a location where it opposes the movable electrode 7.

A plurality of moving electrodes or x-movement electrodes 6a and 6b in the form of comb tines distributed at an equal pitch in the y direction extend to the left and to the right from the oscillator 6 in the x-direction.

Each of the drive electrode anchorages 4a, 5a is integrally formed with a plurality of stationary electrodes or x drive electrode 4b, 5b, respectively, in the form of comb tines in an interdigitated manner with the x-movement electrodes 6a and 6b, respectively, extending from the oscillator 6 so as to move into slots defined between the comb tines formed by the x-movement electrodes. In this manner, microgaps are formed between the x drive electrodes 4b, 5b and the x-movement electrodes 6a, 6b.

It is to be noted that the support beams 2c, 3c, the stems 2d, 2e, 3d, 3e, 3f, the movable electrode 7, x-movement electrodes 6a, 6b and x drive electrodes 4b, 5b are spaced from the surface of the substrate 1, and thus they oppose the surface of the substrate 1 with gaps therebetween. The movable electrode 7 is spaced from the stationary electrode 8 with a gap therebetween. All of these members or elements which are spaced from the surface of the substrate 1 are formed in an integral and continued manner with the oscillator anchorages 2a, 2b, the drive electrode anchorages 4a, 4b or the movable electrode support anchorages 3a, 3b, respectively, as the latter are formed on the surface of the silicon substrate 1 by evaporation of the micromachining technique, as will be described below.

Figure 2:
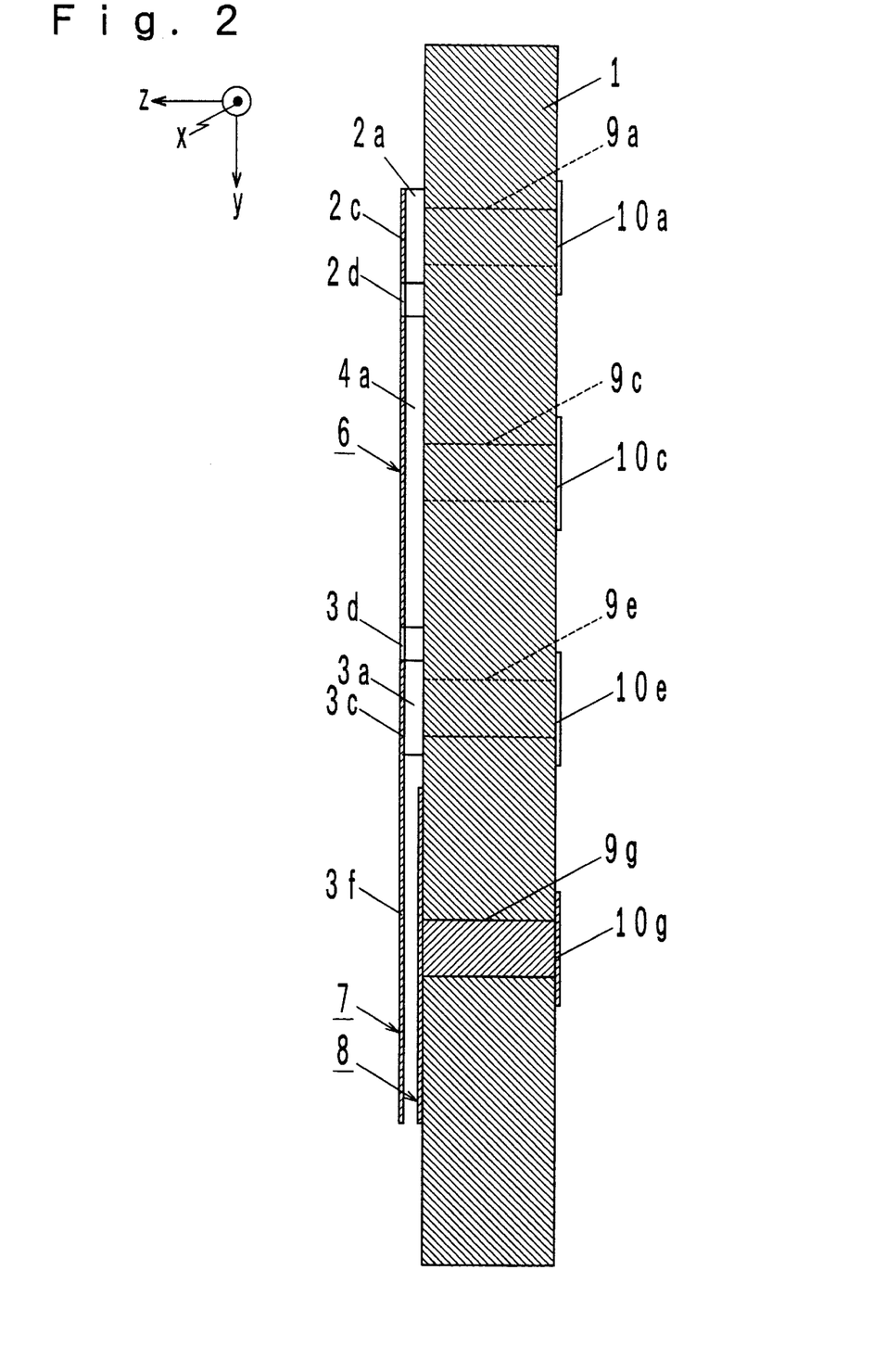
FIG. 2 is a cross section to an enlarged scale of a gyro shown in FIG. 1, taken along the line II—II shown in FIG. 1.
Figure 3:
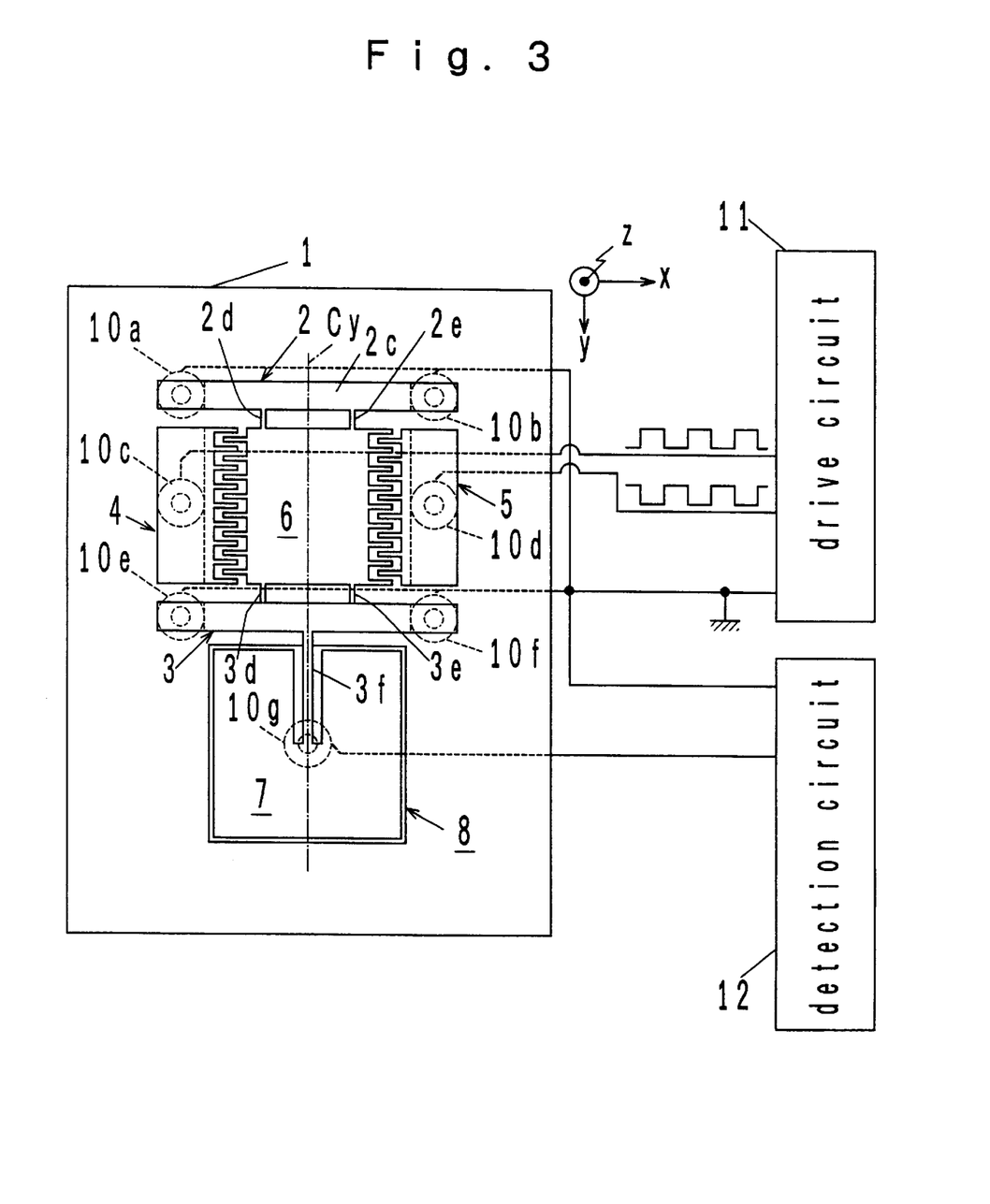
FIG. 3 is a plan view, to a reduced scale, of the gyro shown in FIG. 1.

Starting with the substrate 1 on the surface of which the stationary electrode 8 for forming a capacitance is already formed, a first mask layer is formed on the surface of the substrate 1 at locations below the support beams 2c, 3c, the stems 2d, 2e, 3d, 3e, 3f, the movable electrode 7 and the x-movement electrodes 6a, 6b and the x drive electrodes 4b, 5b. After the first mask layer is formed on the surface of the substrate 1, the first mask layer is etched away at locations below the anchorages 2a, 2b, 4a, 4b and 3a, 3b. A second mask layer is then formed on the surface of the substrate 1, and the second mask layer is again etched away at locations below the anchorages mentioned above, the support beams 2c, 3c, the stems 2d, 2e, 3d, 3e, 3f, the movable electrode 7, the x-movement electrodes 6a, 6b and the x drive electrodes 4b, 5b. Subsequently, a silicon vapor containing an impurity which makes the depositions conductive are evaporated over the entire surface of the substrate 1, and the first and the second mask layer are then removed with a solvent. Then appear individual elements or members on the substrate 1 as shown in FIGS. 1 to 3.

Thus, the oscillator support member 2 is integrally formed with the anchorages 2a, 2b and the support beam 2c, and supports the plate oscillator 6 through the pair of stems 2d, 2e. The drive electrode members 4 and 5 are integrally formed with the anchorages 4a, 5a and the x drive electrodes 4b, 5b. The movable electrode support member 3 is integrally formed with the anchorages 3a, 3b and the support beam 3c, and supports the oscillator 6 through the pair of stems 3d, 3e which are integral therewith, and also supports the movable electrode 7 through the connector stem 3f.

All of the anchorages and the stationary electrode 8 are connected to lead electrodes 10a to 10g (see FIGS. 2 and 3) disposed on the back surface of the substrate 1 through through-hole conductors 9a to 9g (FIG. 2) extending through the substrate 1.

Referring to FIG. 1, when a high voltage is applied across the anchorage 4a (x drive electrode 4b) and the anchorages 2a, 2b, 3a, 3b (oscillator plate 6) from the exterior of the microgyro through the lead electrodes, the electrostatic force acting therebetween causes the oscillator 6 to move toward the anchorage 4a. On the other hand, when a high voltage is applied across the anchorage 5a (x drive electrode 5b) and the anchorages 2a, 2b, 3a, 3b (oscillator 6), the electrostatic force acting therebetween causes the oscillator 6 to move toward the anchorage 5a, Referring to FIG. 3, when a drive circuit 11 alternately repeats these two modes of voltage application, it follows that the plate oscillator 6 oscillates reciprocatively in the x-direction. If an angular rate Ω about the y-axis is applied to the oscillator 6 during such oscillation, the resulting Coriolis force causes the oscillator 6 to undergo an elliptical motion in a plane parallel to the x-z plane about the y axis in which a reciprocatory motion in the z-direction is superimposed upon a reciprocatory oscillation in the x-direction.

Since the stems 2d, 2e, 3d, 3e extend in a direction orthogonal to the x-direction (which is in the y-direction in the example shown, but may also be in the z-direction), these stems are flexural in the x direction. Thus, they are highly susceptible to absorbing the oscillation in the x-direction. However, the support beams 3c, 2c extend in the x-direction, and therefore involve little flexure in the x direction, and hence little oscillation in the x-direction. In this manner, the oscillation in the x-direction is absorbed by the stems 2d, 2e, 3d, 3e, and the transmission of such oscillation to the movable electrode 7 is interrupted or isolated by the support beam 3c.

When the oscillator 6 oscillates in the z-direction, the support beams 3c, 2c are flexural in the z-direction, whereby the support beam 3c transmits the oscillation of the oscillator 6 in the z-direction to the movable electrode 7 through the connector stem 3f. This results in an oscillation of the movable electrode 7 in the z-direction, whereby a capacitance between the movable electrode 7 and the stationary electrode 8 varies in accordance with the oscillation in the z-direction. The variation has an amplitude which is substantially inversely proportional to the amplitude of the oscillator 6 in the z-direction. The capacitance is converted by a detection circuit 12 into an electrical signal level or analog voltage, which represents a capacitance detection signal. It will be seen that the capacitance detection signal has an amplitude which is inversely proportional to the amplitude of the oscillator 6 in the z-direction. Since this amplitude corresponds to the value of the angular rate applied, a synchronized detection of the capacitance detection signal in synchronism with the exciting signal applied to the oscillator provides d.c. voltage having a level which corresponds to the value of the angular rate.

The capacitance between the movable electrode 7 and the stationary electrode 8 remains substantially unchanged in response to a reciprocatory oscillation of the oscillator 6 in the x-direction without any angular rate Ω being applied. However, when the angular rate Ω is applied and there is provided a component of oscillation in the z-direction, the capacitance between these electrodes fluctuates.

When the resonant frequency of the movable electrode 7 coincides with the frequency of the oscillation component of the elliptical motion in the z-direction or the exciting frequency, the oscillation of the movable electrode 7 in the z-direction provides an increased amplitude, thus enhancing the resolution with which the angular rate can be detected. Accordingly, the size of the movable electrode 7 is designed so that the resonant frequency thereof in the z-direction is equal to a preset value or exciting frequency, and if there is a deviation between an actual resonant frequency and the preset value, the actual resonant frequency is tuned to be equal to the resonant frequency in the z-direction by a boring or a milling operation of the movable electrode 7 through a laser machining or adding a mass thereto. The resonant frequency of the oscillator 6 in the x-direction can also be tuned to a desired value by a similar boring or a milling operation through the laser machining operation applied to the movable electrode 7, or adding a mass thereto.

Second Embodiment

FIG. 4 shows a second embodiment which includes an additional pair of movable electrode 13 and stationary electrode 14. The movable electrode 13 is supported by a connector stem 2f which is integral with the support beam 2c. The connector stem 2f extends in the y-direction, and its distal end continues to the movable electrode 13 at a position which represents the center of gravity of the movable electrode 13. To prevent the movable electrode 13 from being cantilevered by the connector stem 2f along its lateral edge, the movable electrode 13 is also formed with a pair of slits 13a, 13b in the similar manner as in the movable electrode 7. In other respects, the arrangement of the second embodiment is similar to that of the first embodiment.

Third Embodiment

FIG. 5 shows a third embodiment of the invention, which represents the addition of a movable electrode support member 16 which support a lateral edge of the first movable electrode 7 and a movable electrode support member 15 which supports a lateral edge of the second movable electrode 13 to the arrangement of the second embodiment. These support members 16, 15 are constructed in the same manner as the support members 3, 2 which support the oscillator 6, and support the first movable electrode 16 and the second movable electrode 13 through stems. In other respects, the arrangement of the third embodiment is similar to the second embodiment.

Fourth Embodiment

FIG. 6 shows a fourth embodiment. It may be considered that the fourth embodiment includes, in essence, a first oscillating mechanism which comprises the plate oscillator 6, the drive electrode members 4, 5 and the support members 3, 2 shown in FIG. 3 in connection with the first embodiment, and a second oscillating mechanism which is similar in construction to the first oscillating mechanism and comprising a plate oscillator 17, drive electrode members 18, 19 and support members 16, 20. The second oscillating mechanism is disposed in symmetrical relationship with respect to the movable electrode 7 so that an oscillation in the z-direction can be applied to the movable electrode 7 from the first and the second oscillating mechanism. It will be noted that the movable electrode 7 is supported by the support members 3 and 6 included in the respective oscillation mechanisms in a cantilevered fashion on its both sides. In other respects, the arrangement of the fourth embodiment is similar to the first embodiment.

Fifth Embodiment

FIG. 7a shows a fifth embodiment. In the fifth embodiment, a plate oscillator 21 is in the form of a rectangular frame, with a movable electrode 21h formed therein. Referring to FIG. 7b, which shows a cross section, to an enlarged scale, taken along the line 7B—7B shown in FIG. 7a, the movable electrode 21h is secured to the substrate 1 by an anchorage 21ia which integrally continues from a stem 21i, located centrally within a slit, and thus is supported by the substrate 1 through the stem 21i. Stems 21d, 21e, 21f, 21g extending from the movable electrode 7 support the plate oscillator 21.

The plate oscillator 21 is excited for oscillation in the x-direction in the similar manner as in the first embodiment, but because the stem 21i extends in the x-direction to block a movement of the movable electrode 21h in the x-direction, the movable electrode 21h does not substantially oscillate in the x-direction. Since the stems 21d, 21e, 21f, 21g which support the plate oscillator 21 extend in the y-direction, and are thus flexural in the x-direction, an oscillation of the plate oscillator 21 in the x-direction is permitted. Since the stem 21i extends in the x-direction and is flexural in the z-direction, the movable electrode 21h oscillates in the z-direction. Thus, when the plate oscillator 21 undergoes an elliptical motion in response to an angular rate applied, a component of oscillation thereof in the z-direction is transmitted to the movable electrode 21h, through the stems 21d, 21e, 21f, and 21g.

Sixth Embodiment

FIG. 8a shows a sixth embodiment. Again, a plate oscillator 21 is in the form of a rectangular frame, in which a movable electrode 21h is formed. Referring to FIG. 8b which shows a section taken along the line 8B—8B shown in FIG. 8a to an enlarged scale, there is disposed a support member 21j in the form of a rectangular frame between the oscillator 21 and the movable electrode 21h, and four corners of the support member 21j integrally continue to anchorages 21ja which are secured to the base 1. A support beam is defined between each pair of adjacent anchorages 21ja. Extending in the y-direction from the pair of opposing support beams which extend parallel to the x-direction are stems 21d (four in all) which are integrally connected to the oscillator 21, and also stems 21k (four in all) which are integrally connected to the movable electrode 21h. Since the pair of support beams which extend parallel to the x-direction are secured to the base at the anchorages, they cannot substantially oscillate in the x-direction while being oscillatable in the z-direction. Accordingly, the movable electrode 21h does not substantially oscillate in the x-direction. When the oscillator 21 undergoes an elliptical motion in response to the application of an angular rate thereto, a component of oscillation thereof in the z-direction is transmitted to the movable electrode 21h through the stems 21d, the pair of support beams extending parallel to the x-direction (part of the support member 21j) and the stems 21k.

In each embodiment described above, the movable electrode 7, 13 or 21h is integral with the plate oscillator 6, 17 or 21, respectively, through stems such as shown at 3d or also through support beams such as shown at 3c in other embodiments, but it should be understood that stems such as shown at 3d which support the oscillator 6 separate it from the remainder in the manner of a floating body as far as the transmission of oscillation is concerned while support beams as shown at 3c substantially interrupt the transmission of the oscillation in the x-direction from the oscillator to the movable electrode and the connector stem as shown at 3f which connect the support beams and the movable electrode together separate the movable electrode from the remainder in the manner of a floating body while transmitting the oscillation of the oscillator 6 in the z-direction through the stems as shown at 3d, the support beams as shown at 3c and connector stem as shown at 3f, thus contributing to facilitating an independent oscillation of the plate oscillator and the movable electrode.

In addition, it is a simple matter to tune the resonance frequency of the oscillator in the x-direction and the resonant frequency of the movable electrode in the z-direction individually by applying a subtraction or addition of a mass to the oscillator and the movable electrode at any desired position through the laser machining operation. A mutual influence that a tuning applied to one of the oscillator and the movable electrode causes a displacement of the resonant frequency of the other is greatly reduced.

While preferred embodiments of the invention have been shown and described above, a number of changes and modifications are possible therein. Accordingly, it is not intended that the invention be limited to the specific construction or arrangement disclosed herein, but that the right is reserved to all changes and modifications coming within the scope of invention defined by the appended claims.

What is claimed is:

1. An angular rate sensor comprising a base, a first oscillator supported on the base so as to be oscillatable in x- and z-directions, exciting means for exciting the first oscillator for oscillation in the x-direction, a stationary electrode, a movable electrode comprising a second oscillator disposed in opposing relationship to the stationary electrode in the z-direction, and movable electrode support means for supporting the movable electrode and transmitting the oscillation from the first oscillator to the movable electrode.

2. An angular rate sensor according to claim 1 in which the movable electrode support means substantially interrupts the transmission of the oscillation in the x-direction from the oscillator to the movable electrode while substantially transmitting the oscillation of the oscillator in the z-direction.

3. An angular rate sensor according to claim 2 in which the movable electrode support means comprises a first set of stems extending in a direction orthogonal to the x-direction and integrally connected to the oscillator at their one end, and a second set of stems extending in the x-direction and integrally connected to the other end of the stems in the first set.

4. An angular rate sensor according to claim 3 in which the movable electrode support means include anchorages secured to the base and integrally connected to the end, as viewed in the x-direction, of the second set of stems for supporting the movable electrode and for also supporting the oscillator through the first set of stems.

5. An angular rate sensor according to claim 4, further comprising an oscillator support including a third set of stems extending in a direction orthogonal to the x-direction and integrally connected to the oscillator at their one end, a fourth set of stems extending in the x-direction and integrally connected to the other end of the stems in the third set, and anchorages secured to the base and integrally connected to the end, as viewed in the x-direction, of the stems in the fourth set.

6. An angular rate sensor according to claim 4 in which the movable electrode and the stationary electrode comprise a first and a second movable electrode and a first and a second stationary electrode disposed substantially in a symmetrical relationship with respect to the oscillator, the movable electrode support means comprising a first support member including a first set of stems extending in a direction orthogonal to the x-direction and integrally connected to the oscillator at their one end, a second set of stems extending in the x-direction and integrally connected to the other end of the stems in the first set and anchorages secured to the base and integrally connected to the end, as viewed in the x-direction, of the stems in the second set for supporting the first movable electrode and for supporting the oscillator through the first set of stems, and a second support member disposed substantially in symmetrical relationship to the first support member with respect to the oscillator and constructed substantially in the same manner as the first support member for supporting the second movable electrode and the oscillator.

7. An angular rate sensor according to claim 6, further comprising a third support member including a third set of stems extending in a direction orthogonal to the x-direction and integrally connected to the first movable electrode at their one end, a fourth set of stems extending in the x-direction and integrally connected to the other end of the stems in the third set, and anchorages secured to the base and integrally connected to the end, as viewed in the x-direction, of the stems in the fourth set, and a fourth support member disposed substantially in symmetrical relationship to the third support member with respect to the oscillator and constructed substantially in the same manner as the third support member for supporting the second movable electrode.

8. An angular rate sensor according to claim 1 in which the movable electrode support means includes a connector stem extending in the y-direction from a second set of stems, the connector stem extending to a position representing the center of gravity of the movable electrode or to the vicinity thereof where it is connected to the movable electrode.

9. An angular rate sensor according to claim 4 in which the oscillator comprises a first and a second oscillator disposed substantially in symmetrical relationship with each other with respect to the movable electrode, the movable electrode support means comprising a first support member including a first set of stems extending in a direction orthogonal to the x-direction and integrally connected to the first oscillator at their one end, a second set of stems extending in the x-direction and integrally connected to the other end of the stems in the first set, and anchorages secured to the base and integrally connected to the end, as viewed in the x-direction, of the stems in the second set for supporting the movable electrode and for supporting the first oscillator through the first set of stems, and a second support member disposed substantially in symmetrical relationship with the first support member with respect to the movable electrode and constructed substantially in the same manner as the first support member for supporting the movable electrode and the second oscillator.

10. An angular rate sensor according to claim 9, further comprising a third support member including a third set of stems extending in a direction orthogonal to the x-direction and integrally connected to the first oscillator at their one end, a fourth set of stems extending in the x-direction and integrally connected to the other end of the stems in the third set, and anchorages secured to the base and integrally connected to the end, as viewed in the x-direction, of the stems in the fourth set, and a fourth support member substantially disposed in symmetrical relationship with the third support member with respect to the movable electrode and constructed substantially in the same manner as the third support member for supporting the second oscillator.

11. An angular rate sensor according to claim 2 in which the movable electrode is disposed within a frame of the oscillator, the oscillator and the movable electrode lying substantially in a common plane.

12. An angular rate sensor according to claim 11 in which the movable electrode support means comprises a first set of stems extending in a direction orthogonal to the x-direction and having their one end continuing to the oscillator and having their other end continuing to the movable electrode, and a second set of stems extending in the x-direction and continuing to the movable electrode.

13. An angular rate sensor according to claim 11 in which the movable electrode support means comprises a first set of stems extending in a direction orthogonal to the x-direction and integrally connected to the oscillator at their one end, a second set of stems extending in the x direction and integrally connected to the other end of the stems in the first set, and a third set of stems having their one end integrally connected to the stems in the second set and having their other end integrally connected to the movable electrode.

14. An angular rate sensor according to claim 12 in which the movable electrode support means include anchorages secured to the base and integrally connected to the end, as viewed in the x-direction, of the stems in the second set for supporting the movable electrode and also for supporting the oscillator through the movable electrode and the first set of stems.

* * * * *